(12) United States Patent
Garimella

(10) Patent No.: US 10,628,572 B2
(45) Date of Patent: Apr. 21, 2020

(54) COMPUTER AND DATA PROTECTION SYSTEM

(71) Applicant: Venkatachalam Garimella, Valrico, FL (US)

(72) Inventor: Venkatachalam Garimella, Valrico, FL (US)

( * ) Notice: Subject to any disclaimer, the term of this patent is extended or adjusted under 35 U.S.C. 154(b) by 0 days.

(21) Appl. No.: 16/289,974

(22) Filed: Mar. 1, 2019

(65) Prior Publication Data
US 2020/0065465 A1  Feb. 27, 2020

Related U.S. Application Data

(60) Provisional application No. 62/722,745, filed on Aug. 24, 2018.

(51) Int. Cl.
*G06F 21/34* (2013.01)
*G06F 21/74* (2013.01)
*G06F 1/18* (2006.01)

(52) U.S. Cl.
CPC .............. *G06F 21/34* (2013.01); *G06F 1/181* (2013.01); *G06F 21/74* (2013.01); *G06F 2221/2149* (2013.01)

(58) Field of Classification Search
CPC ....................................................... G06F 21/34
USPC ............................................................. 726/7
See application file for complete search history.

(56) References Cited

U.S. PATENT DOCUMENTS

| 7,351,110 B1 | 4/2008 | Wu | |
| 9,262,619 B2 | 2/2016 | Garimella | |
| 2008/0056260 A1* | 3/2008 | Ramasamy | ......... H04L 12/4645 370/392 |
| 2015/0113273 A1* | 4/2015 | Rodriguez | .............. H04L 9/321 713/168 |

* cited by examiner

*Primary Examiner* — Jacob Lipman
(74) *Attorney, Agent, or Firm* — Jason T. Daniel, Esq.; Daniel Law Offices, P.A.

(57) ABSTRACT

A computer and data protection system include a peripheral sharing device that is communicatively linked to an onboard internet server and a separate user computer. The onboard internet server is connected to a first communication port for communicating with the separate user computer, and a second communication port for communicating over the internet. A switch selectively transitions the system between a protected operating mode wherein the second communication port is disabled or disconnected, and an open operating mode wherein the first communication port is disabled or disconnected. The system includes an authentication unit having an input/output device for communicating with a removable key. The authentication unit functioning to provide system access only upon successful comparison of a user password that is stored on the physical key with a corresponding user password that is stored in the authentication unit.

17 Claims, 2 Drawing Sheets

COMPUTER AND DATA PROTECTION SYSTEM

CROSS-REFERENCE TO RELATED APPLICATIONS

This application claims the benefit of U.S. Application Ser. No. 62/722,745 filed on 24 Aug. 2018, the contents of which are incorporated herein by reference.

TECHNICAL FIELD

The present invention relates generally to computer security systems, and more particularly to a computer and data protection system.

BACKGROUND

The statements in this section merely provide background information related to the present disclosure and may not constitute prior art.

Every time a computer connects to the internet, it is in danger of being exposed to malicious activities such as malware, spying, hacking etc. It is also true that internet access is a necessity for conducting daily activities of a business and personal nature. For an individual, personal information needs protection. For companies, spying or malware are a constant problem to contend with. Generally, companies spend millions of dollars and time to devise ways to protect their digital files and other such information that is under their control.

To combat information theft, some work places isolate particular computers, such as bank teller terminals, for example, from accessing the internet. However, other computers at such institutions require a connection to the internet (e.g., internet banking), thus rendering "secure" computers vulnerable over the company network.

Although there are many known software-oriented products for preventing unauthorized computer access and data loss, these conventional anti-virus and anti-malware programs rely on the use of passwords, which are proven to be the weak link that allows many of the unauthorized access and data loss situations to occur each year. To this end, user passwords are compared in software and once verified provide the password holder with full access to the system and its defense programs. The longer and more complicated the password is, the more difficult it is to break, but can be difficult for the authorized user to remember. As such, passwords must be short enough for a user to remember and enter each time.

Unfortunately, passwords consisting of between 6 and 8 characters can be easily cracked by a hacker using any number of commercially available password cracking programs, and once the unauthorized user obtains the password, they can take full control of the system, lock out the authorized user, and access other computers connected on the network.

Owing to the vulnerability of the above noted software-based protection methodologies, the need exists for a hardware-based solution which can function to physically isolate and protect computer systems and their data from such external threats. The present invention directed to a computer and data protection system differs from the conventional art in a number of aspects. The manner by which will become more apparent in the description which follows, particularly when read in conjunction with the accompanying drawings.

SUMMARY OF THE INVENTION

The present invention is directed to a computer and data protection system. One embodiment of the present invention can include a peripheral sharing device that is communicatively linked to an onboard internet server and a separate user computer. The onboard internet server can be connected to a first communication port for communicating with the separate user computer, and/or a second communication port for communicating over the internet.

One embodiment of the system can also include a switch for selectively transitioning the system between a protected operating mode and an open operating mode. In the protected operating mode, the peripheral sharing device is engaged with the separate user computer and the second communication port is disabled. In the open operating mode, the peripheral sharing device is engaged with the internet server and the first communication port is disabled.

In another embodiment, the system can include an authentication unit having an input/output device for communicating with a physical key. The authentication unit functioning to provide system access only upon successful comparison of a user password that is stored on the physical key with a corresponding user password that is stored in the authentication unit. This comparison is made by hardware so that malware cannot bypass the comparison or override the results.

This summary is provided merely to introduce certain concepts and not to identify key or essential features of the claimed subject matter.

BRIEF DESCRIPTION OF THE DRAWINGS

Presently preferred embodiments are shown in the drawings. It should be appreciated, however, that the invention is not limited to the precise arrangements and instrumentalities shown.

DETAILED DESCRIPTION OF THE INVENTION

Figure 1:
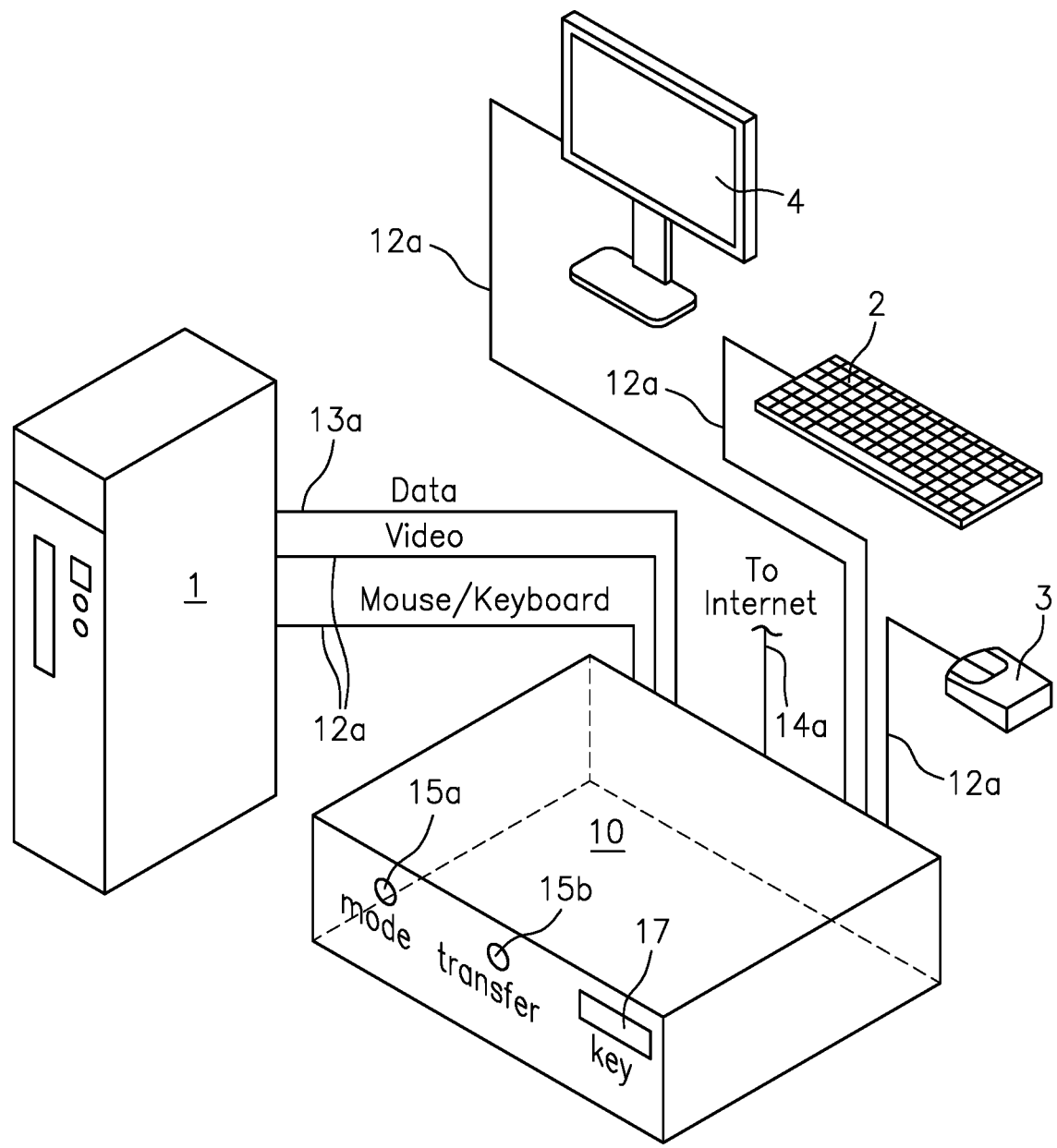
FIG. 1 illustrates an exemplary operating environment of the computer and data protection system that is useful for understanding the inventive concepts disclosed herein.

While the specification concludes with claims defining the features of the invention that are regarded as novel, it is believed that the invention will be better understood from a consideration of the description in conjunction with the drawings. As required, detailed embodiments of the present invention are disclosed herein; however, it is to be understood that the disclosed embodiments are merely exemplary of the invention which can be embodied in various forms. Therefore, specific structural and functional details disclosed herein are not to be interpreted as limiting, but merely as a basis for the claims and as a representative basis for teaching one skilled in the art to variously employ the inventive arrangements in virtually any appropriately detailed structure. Further, the terms and phrases used herein are not intended to be limiting but rather to provide an understandable description of the invention.

Identical reference numerals are used for like elements of the invention or elements of like function. For the sake of clarity, only those reference numerals are shown in the individual figures which are necessary for the description of the respective figure. Various embodiments of a computer data protection system shall be described herein. As will be apparent to those of skill in the art, the below described embodiments are set forth to provide a basic understanding of the presently claimed invention and are not intended to be limiting in any way, as many modifications and variations to the device and/or various method steps are also contemplated.

Figure 2:
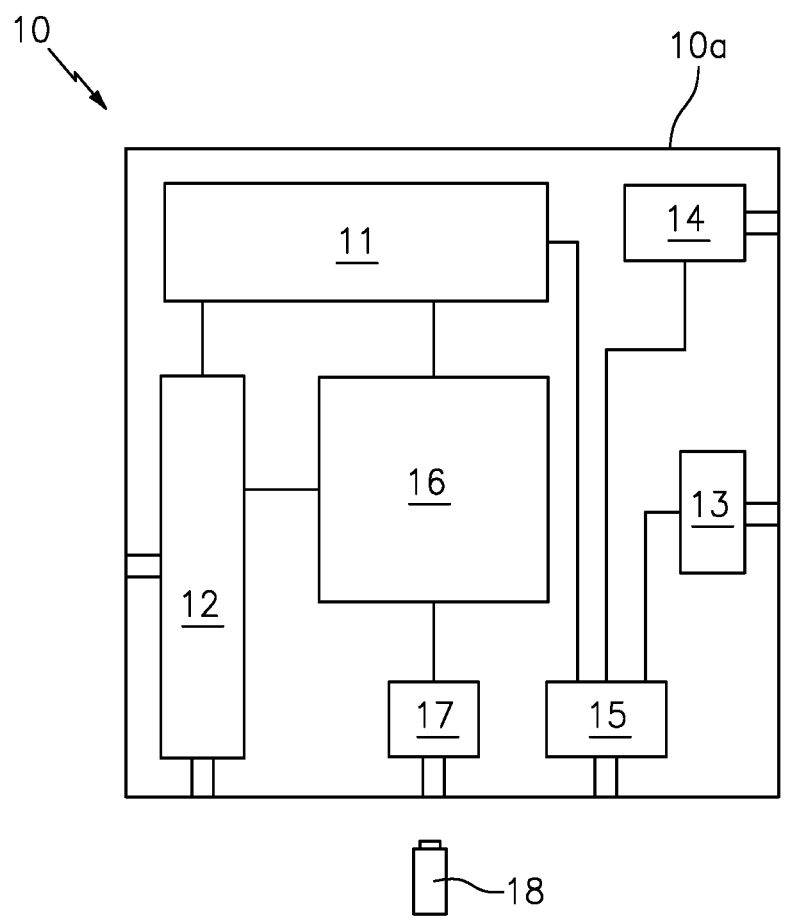
FIG. 2 is a simplified block diagram of the computer and data protection system, in accordance with one embodiment of the invention.

FIGS. 1 and 2 illustrate one embodiment of a computer and data protection system 10 that is useful for understanding the inventive concepts described herein. For the sake of clarity, only those components necessary to demonstrate the below described methodology are illustrated. As such, it is to be understood that any number of additional and/or peripheral components can also be provided with the system.

As shown and described below, the system 10 is designed to protect user data that is contained on a computer 1 from online attacks. Regardless of whether the user computer is a standalone device (e.g., individual personal computer) or a front-end computer for a business, the system 10 functions to isolate the computer 1 from the internet while still allowing an authorized user access to the internet using the same computer-peripherals and with minimal hassle.

In one embodiment, the system 10 can include a discrete main body 10a that houses an internet server 11, a peripheral sharing device 12, a pair of communication ports 13 and 14, a switch 15, and an authentication unit 16 for interacting with a removable key 18.

The main body 10a can function to house the system components in a conventional manner, so as to create a single device. In this regard, the main body 10a can take any number of different shapes and sizes and can be constructed from any number of different materials utilizing known construction techniques.

The internet server 11 can include, comprise or consist of one or more individual computers and/or computing devices having a processor, memory, operating system and other such components that enable the internet server to send and receive information from a secondary device. One suitable example of an internet server 11 for use herein includes the model Z83-F, a single board mini PC that is commercially available from MinisForum, for example; however, any number of other such devices are also contemplated.

The peripheral sharing device 12 can function to allow a single keyboard 2, mouse 3 and monitor 4 to be shared between two connected computers. Each of these components can be communicatively linked via any number of cables 12a. The main objective of this design is security not accessing different computers, and most of the components for sharing and switching peripheral devices, (e.g., keyboard, video, mouse and/or ethernet) are well known in the art. One suitable example is described in U.S. Pat. No. 7,351,110 to Wu, the contents of which are incorporated herein by reference. Of course any number of other components are also contemplated.

In one embodiment, the system 10 can include two distinct communication ports 13 and 14. As described herein, each of the communication ports can include, comprise or consist of any type of device/network equipment that is capable of facilitating communication between two computing devices. Several nonlimiting examples include, but are not limited to ethernet cards, WAN and LAN adapters, wireless network adapters, modems and cellular adapters, for example. Operation of the communication ports can be controlled via the processor of the internet server 11.

In the preferred embodiment, the first communication port 13 and/or the memory of the internet server 11 can be encoded with instructions to allow the first communication port to serve as a dedicated connection between the system 10 and the user computer 1 via a first communication cable 13a (e.g., USB, Ethernet, etc.). Additionally, the second communication port 14 and/or the memory of the internet server 11 can be encoded with instructions to allow the second communication port to serve as a dedicated connection between the system 10 and a less secure/insecure network such as the internet, for example. This communication can be conducted via a separate communication cable 14a and/or wirelessly.

A switch 15 can be positioned between the internet server 11 and the communication ports 13 and 14. The switch can include one or more user controls, such as buttons 15a and 15b, for example, that function to individually and physically disconnect/isolate the communication ports 13 or 14 when a corresponding button is engaged by a user. This gives the user direct control and ensures online attackers cannot bypass.

As will be described below, the switch 15 functions to allow an authorized user to transition the system between a protected operating mode wherein the internet connected port 14 is disabled and the secure computer port 13 is enabled, and an open operating mode wherein the internet connected port 14 is enabled and the secure computer port 13 is disabled. The switch can also be communicatively linked to the peripheral sharing device 12 so as to selectively transition control of the connected peripherals between the internet server 11 and the user computer 1 depending on the selected operating mode.

In the preferred embodiment, the switch 15 can include hardware components controlled by on board CPLD or FPGA components that physically connect and disconnect the ports in direct physical response to actuation of the buttons 15a and 15b. By including hardware components controlled by on board CPLD or FPGA within the switch 15, the system 10 advantageously ensures that operation of the switch 15 cannot be performed remotely through software.

The authentication unit 16 can be communicatively linked with any or all of the above described system components and can function to selectively allow operation of the system 10 only upon a successful authentication of a physical key device. To this end, the authentication unit 16 can function to isolate/disable each of the peripheral sharing device 12 the onboard internet server 11 and/or all other system components, thus rendering the user computer 1 inoperable.

As described herein, the authentication unit 16 can include, comprise or consist of any type of mechanism capable of acting as a gatekeeper for granting and denying access to the system components based upon the below described methodology. In the preferred embodiment, the authentication unit can include a Field-Programmable Gate Array (FPGA) or a Complex Programmable Logic Device (CPLD), for example, which can act to block/prevent electronic signals from reaching designated system components and/or by cutting power to the designated components, for example.

In either instance, the authentication unit 16 can include an input/output device 17 such as a memory card reader, a USB port, and/or a CD/DVD reader, for example, that can send and receive information with a physical key 18, onto which a user password is stored. Of course, the device is not limited to the above described components, as any number of other devices capable of performing the described functionality are also contemplated.

The physical key 18 can include any number of portable storage devices capable of sending and/or receiving information with the input/output device 17. Several nonlimiting examples include an SD card, FPGA, CPLD, a USB memory stick, and/or a CD ROM, for example, that is capable of storing a user password/passphrase and communicating the same to the authentication unit 16 via the input/output device 17.

As described herein, the password can include virtually any type of digital item and/or media that can be stored on the physical key and, when created, can be written to the authentication unit 16, such as the above described FPGA or a CPLD, for example. Several nonlimiting examples include a news article, a long passage from a book, a picture, and/or a complex alphanumeric code/sequence of characters, for example, that preferably contain a minimum of 128 bytes. In this regard, the physical key can function as a dongle to be carried by an authorized user that can prevent the system 10 from operating unless established security protocols have been satisfied.

By requiring user authentication via a key that must be physically coupled to the authentication unit, the system 10 advantageously ensures that none of the system components 10 and/or the user computer 1 can be accessed remotely through one of the communication ports. Additionally, the dongle can be queried at random times to continue the system use without explicit user intervention.

In order to use the computer 1, a user must first insert the removable key 18 to the I/O device 17. When connected, the authentication unit 16 can verify the key before allowing access to the peripheral sharing device 12. At this time, the user may be prompted to enter a second password manually via the keyboard to access the computer 1 or internet server 11, depending on the switch 15 mode. Should either of the verification steps fail, or if the key 18 is removed, the system 10 can deny the user access.

Next, the user can select between the protected operating mode and the open operating mode via actuation of the mode switch 15a, for example; this gives the control to the user and malware cannot mimic it. In the open operating mode, the keyboard, mouse and display are connected to the internet server 11, and the secure communication port 13 to the user computer 1 is physically disabled, thus ensuring that signals emanating from the internet cannot reach the primary computer 1. When operating in the open mode, the internet server executes all commands and handles web browsing, data storage and the like, while remaining physically isolated from the user computer.

In the protected mode the keyboard, mouse and display are connected to the secure user computer 1, and the internet communication port 14 is physically disabled, thus ensuring that signals emanating from the internet cannot reach the primary computer 1.

In one embodiment, when the system is in the protected mode, the secure communication port 13 can be enabled for one-way communication, so as to only receive information from the secure computer 1. Such a feature advantageously prevents any malware of other software that may corrupt the internet server 11 from reaching the secure computer 1. In such a configuration, the system may be configured to allow two-way communication between the system 10 and the computer 1 only upon actuation of the transfer button 15b, for example. Alternatively, the system may be configured to only allow communication between the server 11 and computer 1 when the transfer button is engaged.

Although not specifically illustrated, if the computer 1 is a front end to a larger system, a separate communication port may be installed on the computer 1 to be connected to the secure local area network. This protects the larger system from the internet using the front end to get access to larger system data.

Accordingly, the above described computer and data protection system functions in a novel manner as a stand-alone device that physically isolates a user computer from internet-based threats and from being physically accessed by an unauthorized user.

As to a further description of the manner and use of the present invention, the same should be apparent from the above description. Accordingly, no further discussion relating to the manner of usage and operation will be provided.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As will be appreciated by one skilled in the art, aspects of the present invention may be embodied as a system, method or computer program product. Accordingly, aspects of the present invention may take the form of an entirely hardware embodiment, or an embodiment combining software and hardware aspects that may all generally be referred to herein as a "unit," "module" or "system." Furthermore, aspects of the present invention may take the form of a computer program product embodied in one or more computer readable medium(s) having computer readable program code embodied thereon. If software is used it should be such that it cannot be modified by malware, for example the key making software is on a removable media which prevents unauthorized use.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object-oriented programming language such as Java, Smalltalk, C++ or the like and conventional procedural programming languages, such as the "C" programming language or similar programming languages.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention claimed is:

1. A system, comprising:
a user computer for storing user data;
and a plurality of peripheral devices; and
a data protection system comprising:
   an internet server that includes a processor, and a memory having an operating system encoded with instructions for communicating over an internet;
   a peripheral sharing device that is communicatively linked to the internet server, communicatively linked to the user computer, and communicatively linked to the plurality of peripheral devices;
   a first communication port communicatively linked to the internet server;
   a second communication port communicatively linked to the internet server;
   a switch that is positioned between the internet server and the first and second communication ports, wherein the switch is communicatively linked to the peripheral sharing device, wherein the switch transitions the system between a first operating mode and a second operating mode, wherein the user computer controls the plurality of peripheral devices when the switch is in the first operating mode, wherein the internet server controls the plurality of peripheral devices when the switch is in the second operating mode, wherein the first communication ports is enabled and the second communication port is disabled when the switch is in the first operating mode, wherein the first communication ports is disabled and the second communication port is enabled when the switch is in the second operating mode; and
   a main body for housing each of the internet server, the peripheral sharing device, the pair of communication ports and the switch.

2. The system of claim 1, wherein in the first operating mode, the peripheral sharing device is communicatively linked with the user computer.

3. The system of claim 1, wherein in the second operating mode, the peripheral sharing device is isolated from the user computer.

4. The system of claim 1, wherein the first operating mode is a protected operating mode and the second operating mode is an open operating mode.

5. The system of claim 1, wherein the first operating mode isolates the user computer from an unsecured network and the internet.

6. The system of claim 5, wherein the second operating mode isolates the internet server from the user computer.

7. The system of claim 1, wherein the plurality of peripheral devices comprises keyboard, mouse, and monitor.

8. The system of claim 1, wherein the first communication port is encoded with instructions to serve as a dedicated connection between the internet server and the user computer.

9. The system of claim 8, wherein the switch includes one or more user controls for transitioning the system between the first operating mode and the second operating mode.

10. The system of claim 8, wherein the second communication port is encoded with instructions to serve as a dedicated connection between the internet server and at least one of an unsecured network and the internet.

11. The system of claim 1, further comprising:
an authentication unit that is configured to selectively grant and deny access to the internet server based upon an authentication procedure.

12. The system of claim 11, further comprising:
an input/output device that is communicatively linked to the authentication unit; and
a physical key that is configured to be removably connected to the input/output device.

13. The system of claim 12, wherein the input/output device includes a memory card reader, a USB port, or a CD/DVD reader.

14. The system of claim 12, wherein the physical key includes, a memory card, a USB memory device, a Field-Programmable Gate Array, or a Complex Programmable Logic Device.

15. The system of claim 12, wherein the authentication procedure comprises a comparison by hardware that is stored on the key with a user password that is stored in the authentication unit.

16. The system of claim 15, wherein the authentication unit is configured to provide system access only upon successful authentication.

17. The system of claim 15, wherein the authentication unit is configured to disable access to the system upon determining that the physical key is not physically engaged with the input/output device.

* * * * *